Figure 3:
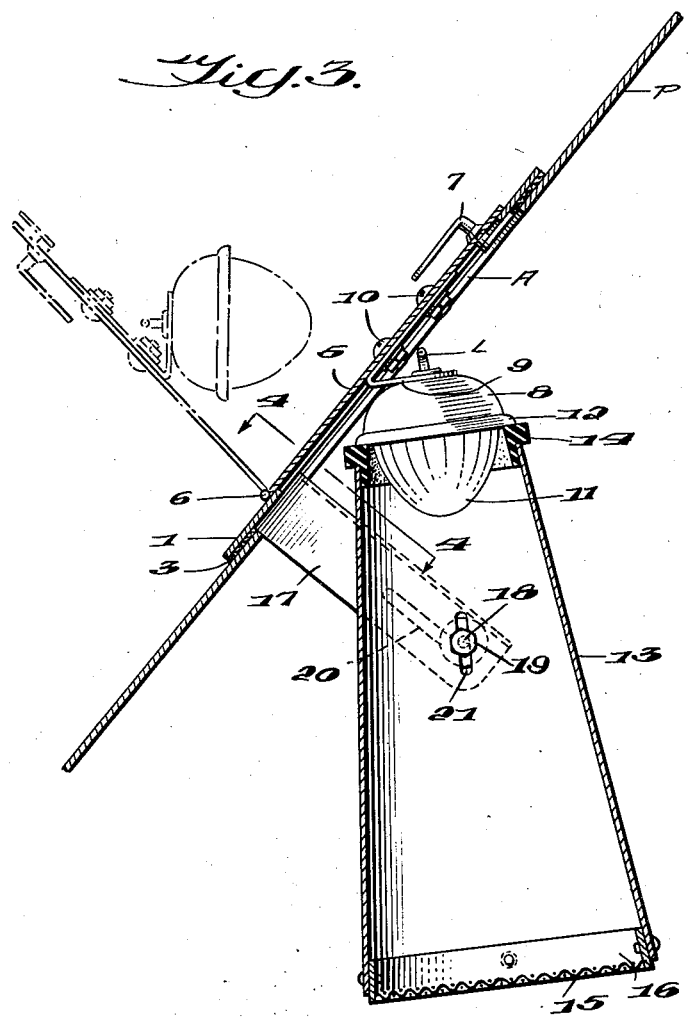

May 15, 1951     J. W. GOOLSBY     2,553,187
VEHICLE ROAD LIGHT CONVERTIBLE FOR
USE AS A TROUBLE LIGHT
Filed Dec. 15, 1947     2 Sheets-Sheet 1
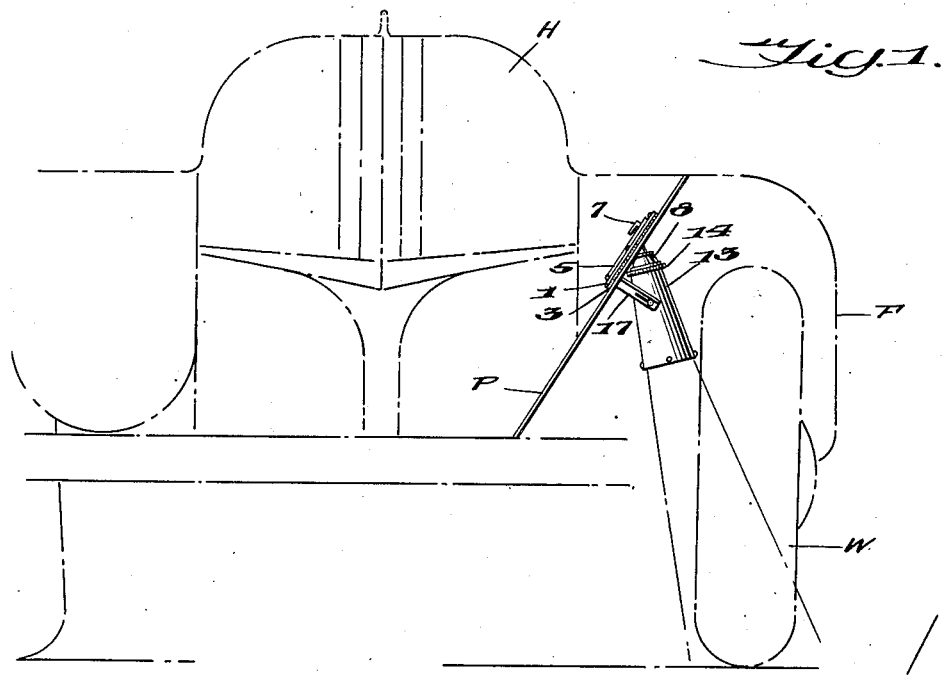
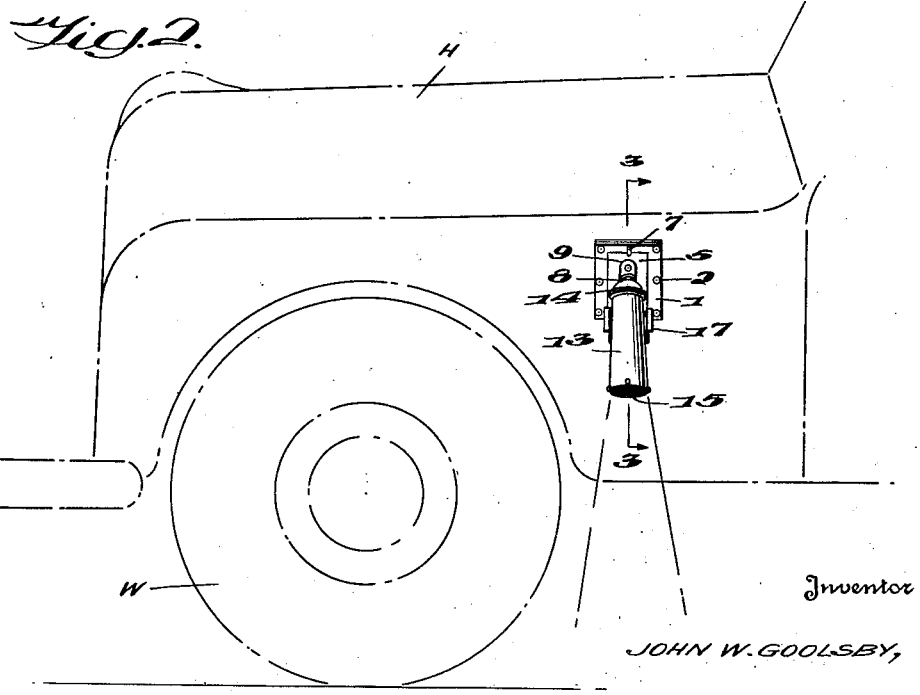
Inventor
JOHN W. GOOLSBY,
By Babcock & Babcock
Attorneys May 15, 1951

J. W. GOOLSBY 2,553,187

VEHICLE ROAD LIGHT CONVERTIBLE FOR USE AS A TROUBLE LIGHT

Filed Dec. 15, 1947

2 Sheets-Sheet 2

Inventor
JOHN W. GOOLSBY,

By Babcock & Babcock

Attorneys

Patented May 15, 1951

2,553,187

UNITED STATES PATENT OFFICE 2,553,187

VEHICLE ROAD LIGHT CONVERTIBLE FOR USE AS A TROUBLE LIGHT

John W. Goolsby, Brownsville, Tex.

Application December 15, 1947, Serial No. 791,837

2 Claims. (Cl. 240—7.1)

This invention relates to an auxiliary light for motor vehicles, and more particularly to such a light which in use illuminates the highway adjacent the vehicle wheels to clearly indicate to drivers of approaching and overtaking vehicles the position on the highway of the vehicle equipped with such light or lights.

While lights of this type have heretofore been known, prior lights of this type have been so constructed and arranged that they have been inaccessible for repairs and cleaning except from beneath their respective vehicles; and further none of such lights has incorporated as a unitary part of its construction means for efficiently protecting the light source from mud, water, dirt and gravel, all of which are thrown up by the wheels of the vehicle.

With the foregoing in mind, the present invention has for its primary objects: to provide in a motor vehicle an auxiliary light which may be readily installed with its light source disposed to project light onto the highway adjacent the vehicle wheels, the light source being readily accessible in the engine or motor compartment of the vehicle for servicing and cleaning; to provide as a unitary part of such an auxiliary light an element associated with the light source to confine and direct the light while at the same time protecting the light source from water, mud, dirt and gravel thrown up by the vehicle wheels; and, to provide such a light which may be readily manufactured and sold as a complete unit or accessory, adapted for ready application to existing vehicles.

A further important object is to provide such a light which may also function as a trouble light to illuminate the engine compartment of the vehicle on which it is installed.

Further objects are: to provide such an auxiliary light which is adapted for application to one of the splash shields or partitions separating the engine compartment of the vehicle from the wheels, the auxiliary light being adapted to project through an aperture formed in the splash shield, with the guarding and light directing element projecting exteriorly of the engine compartment on one side of said splash shield and the light source retractible into the engine compartment on the other side of the shield; and, to provide in conjunction with such an auxiliary light a construction permitting adjustment thereof to the desired vertical angle so that the beam of light therefrom may be directed at the desired location on the highway despite varying angles or positions of the splash shields of different types and makes of vehicles to which such light may be applied.

In order to achieve the foregoing and other incidental objects and advantages, the invention embodies a source of light and a combined guard and light concentrating element, the latter of which is fixedly disposed on the exterior or wheel side of the splash shield in alignment with an aperture formed in said shield. The source of light is carried by a closure member normally covering the aperture and retractible therefrom into the engine compartment, the arrangement being such that in the closed position of the closure member the light source is operatively associated with the adjacent end of the guard and light concentrating element to project light through said element, and in the open position of the closure member the light source is retracted therewith into the motor compartment and preferably directed into the said compartment where it is easily accessible for servicing and cleaning. In such retracted position the light source is also operable to illuminate the engine compartment and engine, and thus may serve as a trouble light in the event engine or motor trouble is encountered during night driving.

Where, as in the preferred embodiment of the invention, the auxiliary light is manufactured as a complete assembled unit ready for installation on a vehicle, the closure member and the guard and light concentrating element aforementioned may both be assembled on an apertured mounting plate which in turn is adapted to be secured to the vehicle splash shield, though obviously it is within the scope of the invention to omit the mounting plate and secure the said member and element directly to the splash shield.

In this application I show and describe only the preferred embodiment of my invention, simply by way of illustration of the practice thereof, as by law required. However I recognize that my invention is capable of other and different embodiments and that the various details thereof may be modified, all without departing from my said invention. Accordingly the drawings and description herein are to be considered as merely illustrative and not as exclusive.

Figure 4:
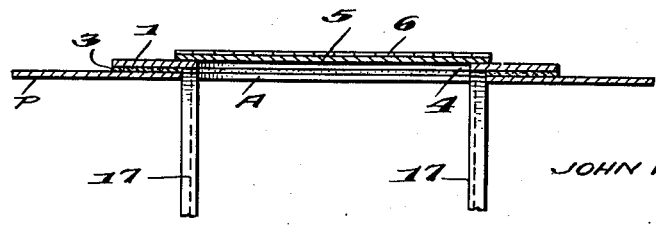

In the accompanying drawings:

Figure 1 represents a front elevation of a motor vehicle having my invention installed thereon, the vehicle being shown in broken lines except for the splash shield thereof on which the invention is mounted;

Figure 2, a side elevation of the invention as it will appear when applied to a motor vehicle, the latter being shown in broken lines;

Figure 3, a detail enlarged section taken on the line 3—3 of Figure 2, looking in the direction of the arrows; and, Figure 4, an enlarged detail section taken on the line 4—4 of Figure 3, looking in the direction of the arrows.

While in practice it is contemplated that the auxiliary lights of my invention will be applied to both sides of the vehicle to illuminate the highway adjacent and preferably rearwardly of each front wheel, each said auxiliary light and its installation will be similar in all respects to the other, and accordingly for the purpose of the present description the invention is shown in conjunction with only one of the vehicle wheels.

Referring now in detail to the accompanying drawings, and particularly to Figures 1 and 2, the reference character P therein designates the usual partition or splash shield of a vehicle disposed beneath a fender F thereof to separate the motor or engine compartment of the vehicle from the adjacent wheel W. Access to the engine compartment may be had in any suitable manner, as through the usual upwardly opening hood H. The aforementioned features are conventional and of course constitute no part of my invention, but are thus briefly referred to in order to promote an intelligent understanding of my invention.

In order to adapt the splash shield P for installation of the invention, said shield is formed with an aperture A therethrough. Such aperture may be of any suitable shape and is of sufficient size to permit insertion of the tubular guard portion 13 of the invention therethrough, in the preferred embodiment, though it is essential only that such aperture be of sufficient size to permit insertion of the light source 8 of the invention therethrough. Preferably this aperture A is of rectangular shape and located just rearwardly of the wheel W at a level substantially even with the top of the wheel, though this exact location is not essential.

To the end that the various elements of the auxiliary light may be assembled in operative relation as a complete unit prior to installation thereof on a vehicle, said elements are preferably assembled on a mounting plate or frame 1 of rectangular shape which is secured to the inner face of the shield P, as by the bolts 2, to define a marginal frame or border around the aperture A. If desired, a usual gasket 3 may be interposed between the frame 1 and shield P to prevent the entry of moisture and dust into the engine compartment between these members.

Associated with the frame 1 is a closure member or cover 5 normally covering the opening 4 therethrough, but retractible into the engine compartment. Preferably this closure member 5 is connected to the frame 1 by means of a hinge 6 so that it may be swung inwardly or retracted about the axis of said hinge, as indicated in dotted lines in Figure 3. Suitable means such as a usual latch 7 may be provided for securing the cover 5 in closed operative position on the frame 1.

Carried by the cover 5 is any usual light source 8 which is disposed to project through the aperture A in the closed position of the cover 5 and to be retracted through said aperture into the engine compartment (as indicated in dotted lines in Figure 3) when the cover 5 is swung toward open position.

In the illustrated embodiment the light source 8 constitutes a usual electric light adapted to be energized by the vehicle battery in known manner, and preferably comprises a transparent or translucent lens 11 together with an annular flange 12 surrounding said lens to seat against the light protecting and concentrating element of the invention.

The light source 8 is so disposed that its rays of light emitted through the lens 11 are directed away from the cover 5 to a point on the road preferably rearwardly of and in longitudinal alignment with the wheel W. Preferably the connection between the light source 8 and the cover 5 is angularly adjustable to permit adjustment of said light source as required in various installations to have the light beam directed to the proper point. A suitable connection for this purpose comprises an angle bracket 9 having one arm or section secured to the light source, as shown, and the other arm or section secured to the cover 5, as by bolts 10. Preferably said bracket 9 is formed of somewhat malleable metal so that the two relatively angularly disposed arms or sections thereof may be bent at different angles relative to each other to adjust the vertical angle of the light 8 as desired.

Mounted on the outer or wheel side of the splash shield P is a guard and light concentrating element 13 for cooperation with the light source 8, said element 13 preferably being in the form of a tube having its inner end disposed to abut against and receive light from the light source 8 in the closed position of the cover 5. Preferably said inner end of the tube 13 is provided with an annular gasket 14 of rubber or other resilient material to form a resilient seat for the flange 12 of the light source and effectively seal the inner end of tube 13 against the entry of mud and dirt which might interfere with the emission of light from the light source 8.

If desired, the lower or outer end of the tube or element 13 may be covered by a wire grill 15 carried on a frame 16 secured in said lower end, as in Figures 2 and 3. The function of such a grill 15 is to prevent pebbles or other solid particles from being thrown into the tube 13 by the wheel W, at an angle to the axis of said tube, to then ricochet along the sides of the tube to the light source 8, with consequent risk of damage.

When installed in operative position on a vehicle, the tube 13 will have its axis in alignment with the aperture A and the light source 8 projecting therethrough, and out of alignment with any portion of the associated wheel W. Thus it will be seen that the tube 13 will protect the light source 8 and the lens 11 thereof against matter which is normally thrown in a tangential direction by the wheel W.

While any suitable means or arrangement may be utilized to mount the element 13 in proper position, I prefer to utilize for this purpose a pair of relatively spaced arms 17 secured to and extending outwardly from the mounting frame 1, the element 13 being secured between said arms 17 by bolts 18 passing through the free ends of said arms respectively and the adjacent side walls of the tube or element 13 and in threaded engagement with nuts 19 disposed interiorly of said element 13.

In order to prevent interference between the splash shield P and the arms 17 where said arms pass through the splash shield aperture A, the frame 1 may be formed and arranged as shown to have its inner periphery or edge extend inwardly from or overlap the corresponding edge or periphery of the aperture A, the arms 17 being suitably rigidly secured to this overlapping portion.

Preferably the connection between the tube 13 and its supporting arms 17 is such as to permit a certain amount of adjustment of said tube or element 13 to the end that it may be arranged in proper operative position on different vehicles to which the invention may be applied. One suitable means of attaining the desired adjustability is shown in the drawings, in which the bolts 18 may be loosened to function as trunnions permitting angular adjustment of the tube 13, these bolts 18 being disposed through slots 20 and 21 respectively in the arms and the tube. It will be seen that the slots 20 in the arms permit adjustment of the tube 13 transverse to its axis, while the slots 21 in the tube extend in an axial direction to permit axial adjustment. After the tube is adjusted to the proper position nuts 19 are tightened.

Before installing such auxiliary lights as described herein, the various components of said light are preferably first secured in operative relation on the mounting frame or plate 1, in the manner aforementioned, to form a complete operative unit. Such a unit may be applied to the vehicle by raising the hood thereof and inserting the tubular element 13 downwardly through the aperture A in the splash shield P until the mounting frame 1 rests on the inner face of said shield. Thereupon, after adjusting the frame 1 to lie in proper marginal relation around the aperture A, said frame is fixedly secured to the splash shield P, as by the bolts 2 aforementioned.

Following this, the tube 13 and light source 8 are both adjusted by manipulation of their respective adjusting means aforementioned, so that the axis of the tube 13 and the beam of light passing therethrough will be directed to a location preferably rearwardly of and in longitudinal alignment with the wheel W, as in Figures 1 and 2, and the tube 13 and light 8 will be disposed in operative position relative to each other in the closed position of the cover 5. The light 8 may be connected to the vehicle battery in usual manner by the line L, it being noted that the metal bracket 9 will serve to ground said light to the cover 5 and splash shield P, to thus establish an energizing circuit through said light 8.

In operation, it will be seen that the light will normally illuminate the highway immediately to the rear of its respective wheel W, thereby indicating clearly the true position of the vehicle relative to the center line of the highway to both approaching and overtaking vehicles and thus serving to promote the safety of night driving. Where the usual vehicle headlights, or one of them, fails to operate, the utility of the invention in indicating the true position of the vehicle will be increasingly apparent, as will the value of the invention in marking the position of the vehicle in the event same is parked or disabled along a highway.

The tubular element 13 of the invention, in addition to concentrating the light at the desired location on the highway and preventing it from shining into the eyes of passing motorists, serves as a guard to prevent the light source 8 from being damaged by objects thrown up by the vehicle wheels in operation, and also serves to prevent same from becoming dirty or clouded for long periods of time, though it will be apparent that after relatively long periods of driving a certain amount of dirt in the form of finely pulverized dust, mist, etc., will eventually coat and partially or wholly obscure the light source or its lens 11. When this occurs, the lens may be cleaned easily and simply, by raising the vehicle hood to gain access to the engine compartment, releasing the latch 7 and swinging or retracting the cover 5 and light 8 into the engine compartment where the lens 11 may be easily wiped clean. Also, where desired, the light source 8 may be retained in its rearwardly swung or retracted position for use as a trouble light to illuminate the engine compartment and its contents.

I claim:

1. A wheeled motor vehicle comprising an apertured splash shield separating the engine compartment of said vehicle from one of the wheels thereof, in combination with a tubular light guard mounted on the wheel side of said shield in alignment with said aperture and spaced rearwardly of said wheel, said guard having one end disposed closely adjacent to said aperture, a cover hingedly associated with said shield within said engine compartment and normally closing said aperture, a light carried on one side of said cover to register with the adjacent end of said tubular guard and project its rays therethrough in the closed position of said cover, said cover and light being swingable away from said guard into said engine compartment whereby said light will illuminate the interior of and be readily accessible within the engine compartment.

2. A wheeled motor vehicle comprising an apertured splash shield separating the engine compartment of said vehicle from one of the wheels thereof, in combination with a tubular light guard mounted on the wheel side of said shield in alignment with the aperture thereof and spaced rearwardly of said wheel, said guard having one end disposed closely adjacent said aperture, and a light hingedly connected to said splash shield for movement through said aperture into registering alignment with the adjacent end of said guard to project its rays through said guard, said light being swingably retractible from said guard through said aperture and into said engine compartment to illuminate the interior of the engine compartment.

JOHN W. GOOLSBY.

REFERENCES CITED

The following references are of record in the file of this patent:

UNITED STATES PATENTS

| Number | Name | Date |
| --- | --- | --- |
| 1,347,011 | Cochran | July 20, 1920 |
| 1,443,290 | Strong | Jan. 23, 1923 |
| 1,611,706 | Adolphson et al. | Dec. 21, 1926 |
| 1,624,436 | Rosemier | Apr. 12, 1927 |
| 1,647,011 | Morgan | Oct. 25, 1927 |
| 1,761,345 | Isackson | June 3, 1930 |
| 1,781,865 | Aniol | Nov. 18, 1930 |
| 1,882,188 | Makaroff | Oct. 11, 1932 |
| 1,908,553 | Rashleigh | May 9, 1933 |
| 2,312,005 | Smith | Feb. 23, 1943 |

FOREIGN PATENTS

| Number | Country | Date |
| --- | --- | --- |
| 658,088 | Germany | Mar. 22, 1938 |